US009210146B2

(12) United States Patent
Shimshoni

(10) Patent No.: US 9,210,146 B2
(45) Date of Patent: Dec. 8, 2015

(54) SECURE CONTENT TRANSFER USING DYNAMICALLY GENERATED OPTICAL MACHINE READABLE CODES

(71) Applicant: Daniel S. Shimshoni, Seattle, WA (US)

(72) Inventor: Daniel S. Shimshoni, Seattle, WA (US)

(73) Assignee: Daniel S. Shimshoni, Seattle, WA (US)

( * ) Notice: Subject to any disclaimer, the term of this patent is extended or adjusted under 35 U.S.C. 154(b) by 211 days.

(21) Appl. No.: 13/759,702

(22) Filed: Feb. 5, 2013

(65) Prior Publication Data
US 2013/0219516 A1    Aug. 22, 2013

Related U.S. Application Data

(60) Provisional application No. 61/633,830, filed on Feb. 18, 2012.

(51) Int. Cl.
*H04L 29/06* (2006.01)
*H04W 12/06* (2009.01)

(52) U.S. Cl.
CPC .............. *H04L 63/08* (2013.01); *H04L 63/083* (2013.01); *H04W 12/06* (2013.01)

(58) Field of Classification Search
CPC ... H04L 63/08; H04L 63/083; H04L 63/0846; H04L 63/0492; G06F 21/6245; H04W 12/06; G06Q 20/208; H04N 1/00334; G06K 7/14; G06K 7/1447
USPC ........................ 726/6–9, 26–29; 713/170–172
See application file for complete search history.

(56) References Cited

U.S. PATENT DOCUMENTS

| | | | |
|---|---|---|---|
| 6,802,005 B1 * | 10/2004 | Berson | 713/178 |
| 7,010,501 B1 * | 3/2006 | Roslak et al. | 705/23 |
| 7,114,179 B1 * | 9/2006 | Ritter et al. | 726/7 |
| 7,716,245 B2 * | 5/2010 | Omae et al. | 707/787 |
| 8,799,658 B1 * | 8/2014 | Sellier et al. | 713/172 |
| 8,817,334 B2 * | 8/2014 | Kikuchi | 358/468 |
| 8,862,888 B2 * | 10/2014 | Tolba et al. | 713/179 |
| 8,869,248 B2 * | 10/2014 | Moosavi et al. | 726/5 |
| 2003/0001016 A1 * | 1/2003 | Fraier et al. | 235/462.03 |
| 2004/0225613 A1 * | 11/2004 | Narayanaswami et al. | 705/64 |
| 2006/0053066 A1 * | 3/2006 | Sherr et al. | 705/26 |
| 2006/0111967 A1 * | 5/2006 | Forbes | 705/14 |
| 2007/0050696 A1 * | 3/2007 | Piersol et al. | 715/500 |
| 2007/0233613 A1 * | 10/2007 | Barrus et al. | 705/71 |
| 2007/0283447 A1 * | 12/2007 | Hong et al. | 726/28 |
| 2008/0209534 A1 * | 8/2008 | Keronen et al. | 726/9 |
| 2009/0022314 A1 * | 1/2009 | Wada et al. | 380/246 |
| 2009/0036099 A1 * | 2/2009 | Han | 455/411 |
| 2009/0248537 A1 * | 10/2009 | Sarkeshik | 705/26 |
| 2009/0293110 A1 * | 11/2009 | Koga | 726/6 |
| 2010/0036772 A1 * | 2/2010 | Arceneaux | 705/50 |
| 2010/0095119 A1 * | 4/2010 | Tachibana | 713/168 |
| 2010/0309505 A1 * | 12/2010 | Partridge et al. | 358/1.15 |
| 2010/0328728 A1 * | 12/2010 | Kakutani | 358/448 |
| 2011/0041174 A1 * | 2/2011 | Akiyama et al. | 726/7 |
| 2011/0154456 A1 * | 6/2011 | Machani | 726/6 |
| 2011/0208659 A1 * | 8/2011 | Easterly et al. | 705/79 |
| 2011/0210171 A1 * | 9/2011 | Brown et al. | 235/382 |

(Continued)

*Primary Examiner* — Catherine Thiaw
(74) *Attorney, Agent, or Firm* — Turk IP Law, LLC

(57) ABSTRACT

Technologies are generally described for peer-to-peer or peer-to-server-to-peer communication systems based on mobile devices, servers, and personal computers, which utilize proximity communication and optical codes such as two-dimensional barcodes, in order to securely initiate and authorize digital data, file, and multimedia transfers, as well as digital financial transactions.

11 Claims, 7 Drawing Sheets

(56) References Cited

U.S. PATENT DOCUMENTS

| | | | |
|---|---|---|---|
| 2011/0270751 A1* | 11/2011 | Csinger et al. | 705/42 |
| 2012/0028609 A1* | 2/2012 | Hruska | 455/411 |
| 2012/0054010 A1* | 3/2012 | Bouta et al. | 705/14.16 |
| 2012/0089518 A1* | 4/2012 | Blonchek | 705/50 |
| 2012/0106780 A1* | 5/2012 | Ellis | 382/100 |
| 2012/0132704 A1* | 5/2012 | Black | 235/379 |
| 2012/0132706 A1* | 5/2012 | McKenzie | 235/380 |
| 2012/0136798 A1* | 5/2012 | Navar et al. | 705/71 |
| 2012/0136936 A1* | 5/2012 | Quintuna | 709/204 |
| 2012/0175419 A1* | 7/2012 | O'Keefe | 235/437 |
| 2012/0181330 A1* | 7/2012 | Kim | 235/375 |
| 2012/0217296 A1* | 8/2012 | Merel | 235/380 |
| 2012/0261465 A1* | 10/2012 | Vasquez et al. | 235/375 |
| 2013/0031623 A1* | 1/2013 | Sanders | 726/19 |
| 2013/0110676 A1* | 5/2013 | Kobres | 705/26.41 |
| 2013/0133086 A1* | 5/2013 | Liberman et al. | 726/28 |
| 2013/0212004 A1* | 8/2013 | Itwaru | 705/39 |

* cited by examiner

SECURE CONTENT TRANSFER USING DYNAMICALLY GENERATED OPTICAL MACHINE READABLE CODES

CROSS REFERENCE TO RELATED APPLICATIONS

This Application claims the benefit under 35 U.S.C. §119 (e) of U.S. Provisional Patent Application Ser. No. 61/633,830 filed on Feb. 18, 2012. The disclosure of the provisional patent application is hereby incorporated by reference for all purposes.

BACKGROUND

The confluence of mobile devices with built-in cameras, wireless data connectivity, and matrix-based machine-readable optical codes has created a new paradigm in communications. Mobile device users are now continuously connected to the Internet which allows them to access a server from their devices. Additionally, the majority of smartphone mobile devices now come with a built-in camera as standard. With software installed on the mobile device, the mobile device can now become a barcode scanner and reader, capable of scanning and reading optical codes of any type. This action of optical barcode scan to server access, opens a path for file exchanges and data transfers.

Security is one of the main concerns in exchange of files, media, and other forms of data. While progress in networking and wireless communication technologies enables advanced and easy methods of data exchange between stationary and mobile computing devices, the advances have also opened numerous ways of abuse for malicious attackers. Thus, ensuring security and authorization between devices prior to data exchange is a challenge.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to peer-to-peer or peer-to-server-to-peer communication systems based on mobile devices, servers, and personal computers, which utilize proximity communication and optical codes such as two-dimensional barcodes, in order to securely initiate and authorize digital data, file, and multimedia transfers, as well as digital financial transactions.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which.

DETAILED DESCRIPTION

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Figure 1:
FIG. 1 illustrates front and back views of a mobile device with a camera that is capable of capturing and decoding a machine-readable code such as a two-dimensional barcode.

FIG. 1 illustrates front and back views of a mobile device with a camera that is capable of capturing and decoding a machine-readable code such as a two-dimensional barcode.

The confluence of mobile devices with built-in cameras, wireless data connectivity, and matrix-based machine-readable optical codes has created a new paradigm in communications. Mobile device users are now continuously connected to the Internet which allows them to access a server from their devices. Additionally, the majority of smartphone mobile devices now come with a built-in camera as standard. With software installed on the mobile device, the mobile device can now become a barcode scanner and reader, capable of scanning and reading optical codes of any type. Diagram 100 shows front view 106 and rear view 104 of a typical mobile device with a camera 102 in the back and a display 108 in the front. The camera can capture, among other things, a machine-readable code such as a two dimensional barcode 110 and display it on the display 108. The mobile device may also decode the barcode retrieving the information encoded in the barcode.

Figure 2:
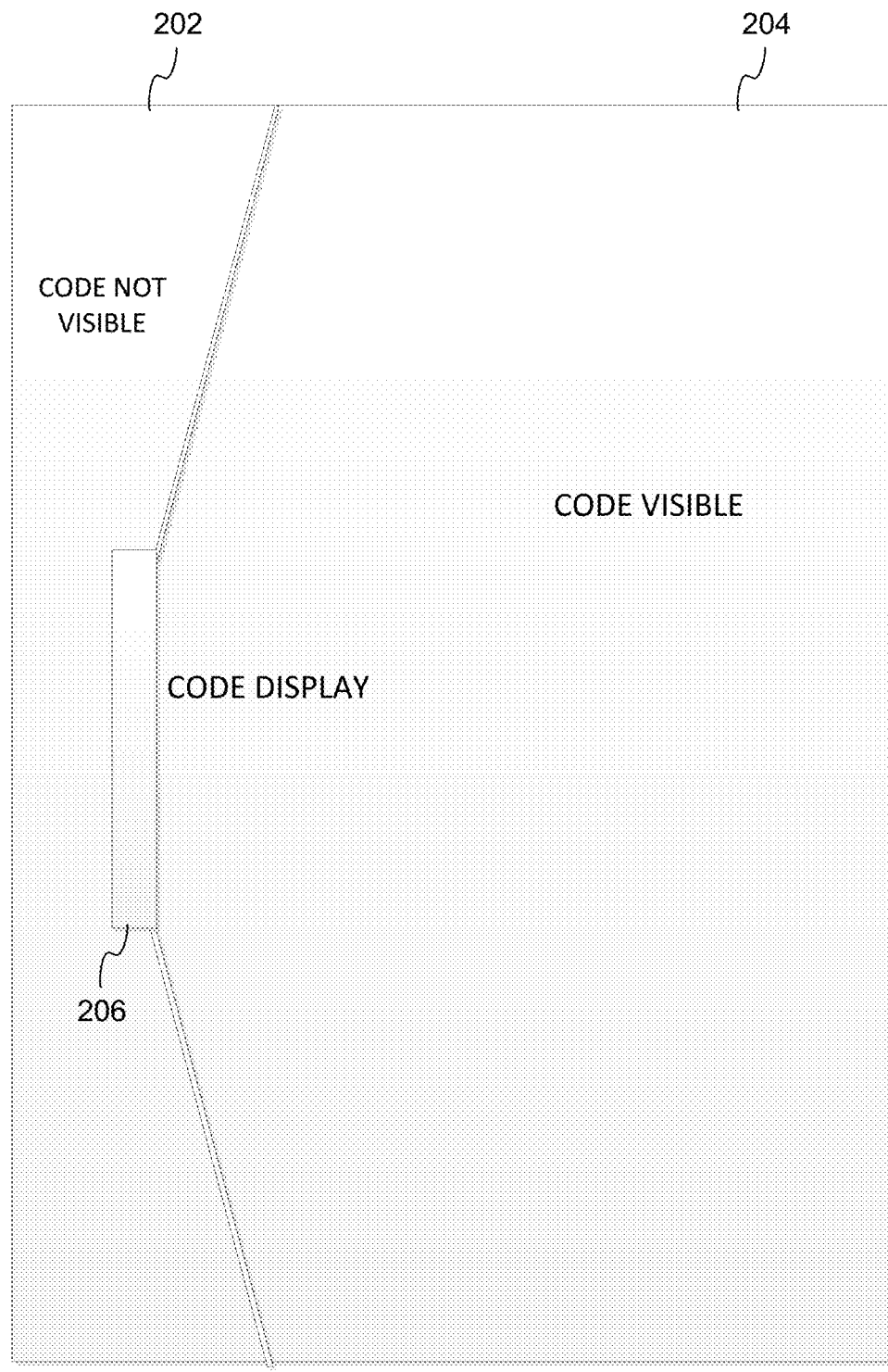
FIG. 2 illustrates conceptually the difference between visible and non-visible parts of an optical code.

FIG. 2 illustrates conceptually the difference between visible and non-visible parts of an optical code.

Taking advantage of optical scanning capabilities of mobile devices, a system according to embodiments may utilize optical barcode scan for server access, file exchanges, and data transfers. Optical codes are secure because their visibility can be controlled. As shown in diagram 200, an optical code may comprise of a visible portion 204 and a not visible portion 202 separated by the code display 206. Furthermore, optical codes may be configured with time-stamp expirations, limits to the number of scans permitted, and limits to which system can communicate with a specific optical code. Additionally, when an optical code is configured to communicate with a server, the wide availability of cloud-based data storage and modern encryption systems may provide for easily controlled and efficient data and file transfers.

In order to satisfy the proximity requirement, transactions in a system according to embodiments may represent the following four aspects: (1) the communication link may be established via optical code in a proximity based environment; (2) the communication channel may be established via optical code as soon as a mobile device user scans the optical code; (3) the communication channel may be established via optical code for a specific file or files, data, or use case; and (4)

the communication channel may be established via optical code to a specific recipient, either a person, mobile device, computer, or server.

Other proximity-based technologies, such as Remote Frequency Identification (RFID) and Near-Field Communications (NFC) attempt to address some of the aspects covered by example embodiments. For example, The SHA-1 (US Secure Hash Algorithm) cryptographic hash function (RFC 3174) is used to generate content digests. Other proximity based technologies include the consumer application for mobile operating systems, which utilizes the accelerometer and Global Positioning System (GPS) for proximity based data transfers. Additionally, Bluetooth technology is frequently used for proximity based data transfers. However, none of these approaches combine optical code use with proximity based secure transactions.

Figure 3:
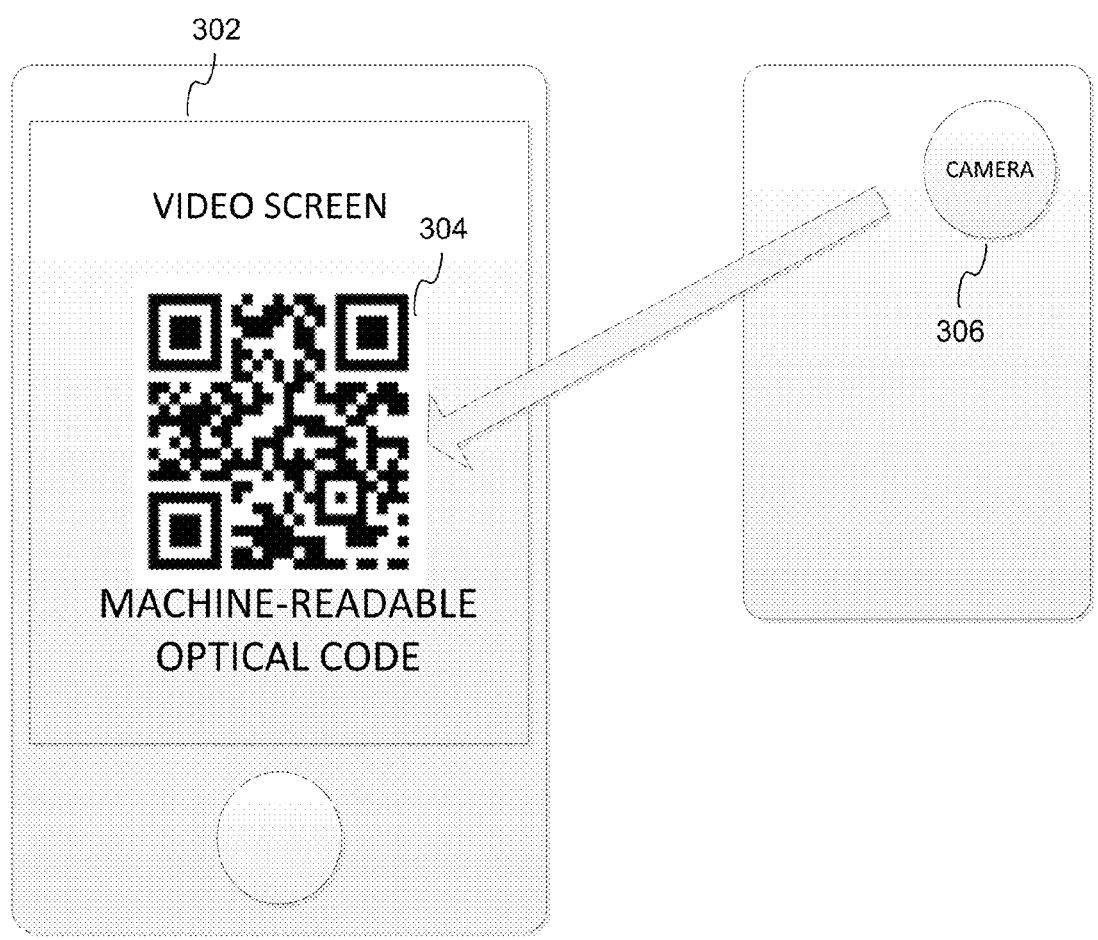
FIG. 3 illustrates initiation of data exchange by capturing a barcode according to some example embodiments.

FIG. 3 illustrates initiation of data exchange by capturing a barcode according to some example embodiments.

As mentioned above, for a proximity based secure transaction system, the parties involved in the transaction need to be in physical proximity with each other. Whether the parties are two people with mobile devices or one person holding a mobile device connecting with a server or computer, the transaction may be initiated with the scanning of an optical code whereby both parties are in physical proximity to each other.

The transaction may begin when the party with the mobile device scans (through camera 306) an optical code 304, which may be displayed on the mobile device's display 302. The transaction may be completed or may occur at a later time and date, but the initial scan may happen within a limited time period determined by the sender. When the party with the mobile devices scans the optical code, they may be aware of a connection that they are initiating. This initiation scan may start the transaction process as shown in diagram 300.

When one party scans an optical code, they know that the scan is in order to connect their mobile device, private cloud, or system to the mobile device or system that is represented by the optical code. The scan is for a specific purpose, which may be for transferring files and data, completing financial transactions, or for authentication in a system according to embodiments.

The optical code may represent a system. The party scanning the optical code does not necessarily need to know which system the optical code represents in this transaction. However, the scanning party may know that they are scanning an optical code and that they are communicating to a system. The party that supplies the optical code may control who sees the optical code and who scans it. This may be accomplished visually, by restricting visibility of the optical code (as described in FIG. 2), or by configuration, restricting the results of a scan by time, availability, and privacy.

Figure 4:
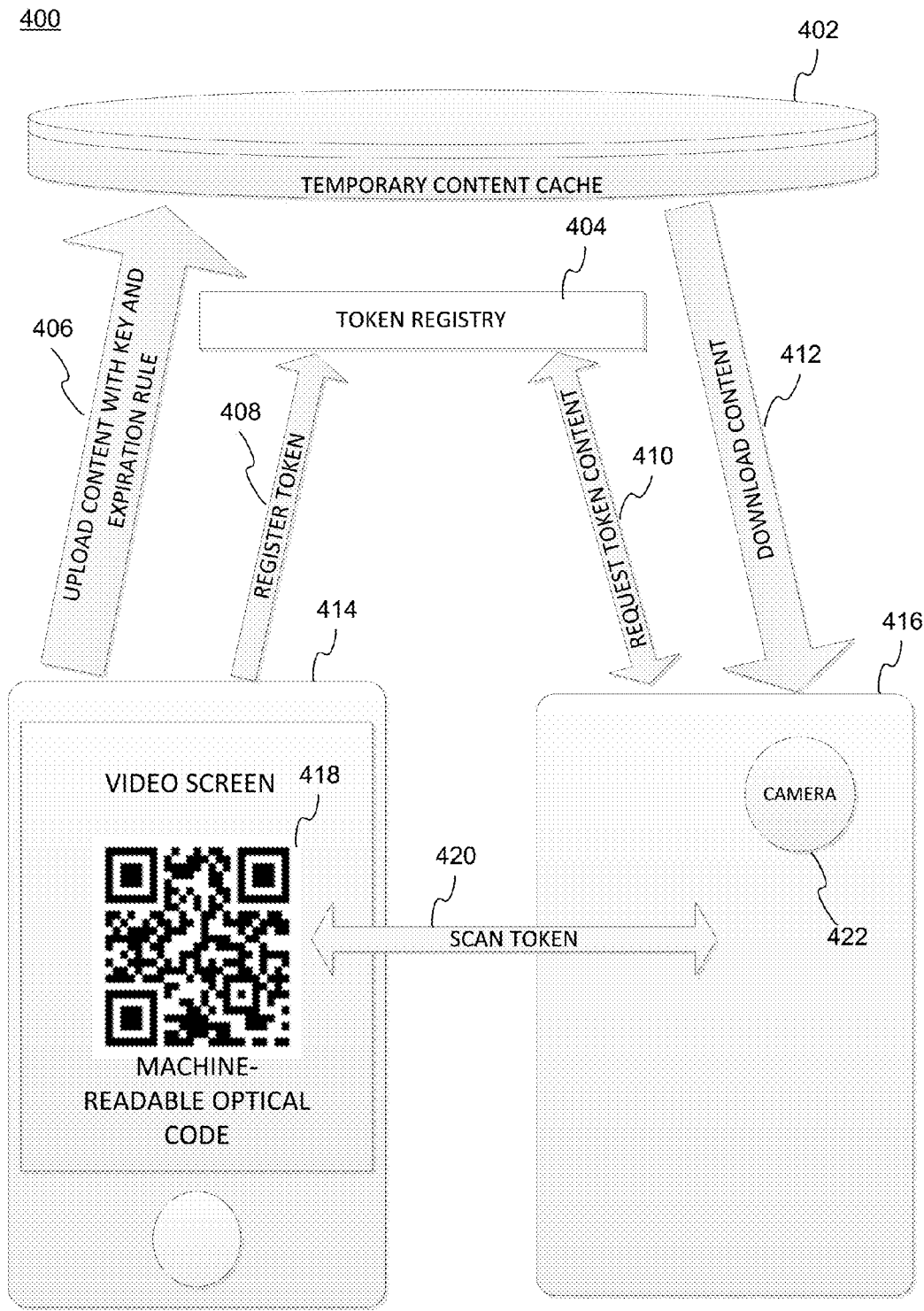
FIG. 4 illustrates steps in initiation and transfer using an optical code.

FIG. 4 illustrates steps in initiation and transfer using an optical code.

Diagram 400 shows a an optical code 418 being scanned (420) through the camera 422 of a mobile device 414. The token may be registered (408) with a token registry 404 and token content may be requested (410) as a result of the registration. The mobile device 414 may also upload content with a key and an expiration rule (406) to a temporary content cache 402 according to some example embodiments and content may be downloaded (412) from the temporary content cache 402 to the mobile device 414.

At the initial step, a unique text temporary token may be generated and registered with the relay server. The registration may include the following information: token, one or more content keys and an expiration rule, which may include time/date, number of scans or both. In addition, the content stored in the next step described below may only be available until the latest of the expiration dates of any token pertaining to this particular content and that of the content key itself.

A unique key may be generated for the transferred content at the next step. This may be referred to as a content digest. The content may also be assigned a validity expiration rule which may include a date/time, number of downloads or both. The key may be unique to the content in its current state. The content may be stored on a server (e.g., in the "cloud"). The originator may have the information about the location of the data in the cloud and its key. The pair location/key may be the content registered in the step above (registration of a temporary token.) It should be noted that the term server may be used widely in this context and may even refer to a connected device, which may or may not be the recipient.

According to some embodiments, an additional security layer may be achieved when the sender encrypts the content prior to step a. above. The key may not be sent to the server and may only be communicated optically as part of the optical code display for scanning by the receiver. The receiver may then receive the encrypted content through the mechanism described herein and use the key scanned optically from the server in order to decrypt the data. One-time, unique keys may be generated for each transfer initiated by the sender, so that they cannot be reused to decrypt data sent in other transfers, potentially intended to other receivers.

The temporary token, registered in the first step above may be used to generate and display a machine-readable optical code on the mobile device. The optical code may be configured to be read only by devices that have direct visual contact with the screen.

According to other embodiments, the originator may be in total control of whom the generated optical code is going to be shown to. It may be displayed directly from of the recipient's barcode scanner, for example.

According to some embodiments, a system as described herein may be used in social networking realm, where people in physical proximity can transfer information about themselves, or content, data, and files they own, by generating a machine-readable optical code on their smartphones scanned by the cameras of other smartphones. Such content may include, but not limited to, photos, videos, sounds and audio, music, calendar events, contact information (address book), documents, spreadsheets, presentations, textual data (e.g., notes), phone numbers, email message, text messages, email addresses, social network interactions, wireless network connections, surveys, contest information, coupon information, product information for purchase, entry forms, and similar ones.

A system according to other embodiments may be utilized for payments to brick-and-mortar businesses by displaying a machine-readable optical code generated on the customer's device that the business scans. The optical code may be the temporary token of the transaction authorized and authenticated on the user device. It may only apply to the current transaction with a specified amount, like a paper bank check, and unlike a credit card, may not be reused and the terms may not be changed for security reasons. Since the authentication is done on the user's devices and not on the business equipment, the risk of stealing secret information, such as pin and other sensitive personal information may be reduced.

In yet other embodiments, an optical scan based proximity security system may be used in conjunction with services, such as doctor's offices, which may transfer appointment information to the patients on an optical code displayed on a screen or printed on paper. This optical code may be scanned by the patient and automatically integrated into the customer's personal information system. This may be applied to any situation or business whereby appointments are part of the generally accepted method of doing business.

Additionally, embodiments may be used in privacy sensitive contexts where digital content is exchanged. For example, a patient obtaining a medical record from a medical provider may use their mobile device to receive their medical record in a secure and legally compliant manner.

In further embodiments, users may authenticate into digital environments using the principles described herein. A machine-readable optical code may be displayed on a website or on a piece of paper. When a user scans this code they may authenticate into a system or server. This type of authentication may replace passwords and user id login information or it may complement current methods of authentication, which utilize passwords and login credentials. This type of authentication may be applied to, but not limited to, the following digital environments: financial institution websites, media websites, insurance websites, social network websites, e-commerce websites, blogs, and/or brokerage websites.

Example embodiments described herein for secure, proximity based file and data transfers may be implemented with mobile devices, cameras, computers, and servers. A mobile device according to embodiments needs to include an optical capture device such as a camera that can read optical codes. Moreover, embodiments take advantage of the ability of mobile devices to be connected to the Internet at any time. Given this, via the camera on the mobile device, the mobile device may act as an intermediary to connect the mobile device—and the digital applications associated with it, both locally and hosted, with another virtual or digital system. The mobile device may utilize its camera and the software on the device to read optical codes by discretion of the user. The optical code may be supplied by another mobile device user, or another party that can display an optical code on a mobile device, computer monitor, LCD screen, digital screen, or physical material whereby an image can be printed upon it, such as a sheet of paper or sticker.

The party that supplies the optical code may control who sees and who can gain access to the system that is associated with the optical code. The entity that supplies the optical code may control it by limiting its visibility, as a party scanning this optical code needs to be within range of the optical code to scan it, and they can control it by limiting its access. The access limitation may be controlled by the number of scans permitted for each optical code, as well as a specific amount of time that is allowed for the optical code scan to be valid. Additionally, the optical code may be associated with a specific system, and if the scanning party does not have permission to access the specific system associated with the code, then the entity providing the code can deny the scanner permission to access the system.

The scan itself, from a party with a mobile device with a camera, to a valid optical code represents an action that is similar to a handshake. The physical equivalent may be the physical exchange of a sheet of paper, whereby both parties know each other because they see each other, and they exchange a sheet of paper. Embodiments represent an electronic handshake because of the proximity based nature. Both parties may have the ability to accept or deny access to the connection, which occurs in physical proximity via the optical code. The connection is secure because of its proximity based nature. Additionally, no private or personal information may be exchanged in order to establish the connection. The connection may be established simply by scanning an optical code, which makes the connection action anonymous. However, since a mobile device is associated with a user, the recipient knows which device scanned their specific optical code, and may therefore know who scanned their code. The scanner may know that this optical code connects their device to a system so they can understand the type of transaction taking place.

Once the secure connection is established via the optical code scan, the two parties may communicate securely. Via this secure channel, they may exchange information, files, data, or any type of digital content. Furthermore, the channel may be opened up to more than two parties at the discretion of the two parties involved, to include any number of parties in the secure channel that can access the secure channel through an optical code scan. Additionally, any party inside of the secure channel may terminate their communication within the secure channel at any given time and at their discretion.

A system according to embodiments may also serve to bridge a gap between real world and virtual world identification and communication. A mobile device is an extension of a person and is their physical key to access the virtual world. Embodiments may employ optical codes that serve as keys to access the virtual world of disparate systems. Therefore, when sending, sharing, or transferring data, users and systems may control who receives what, and when they receive it. The type of content being transferred may be limited or may be expanded at the discretion of the sending user.

Figure 5:
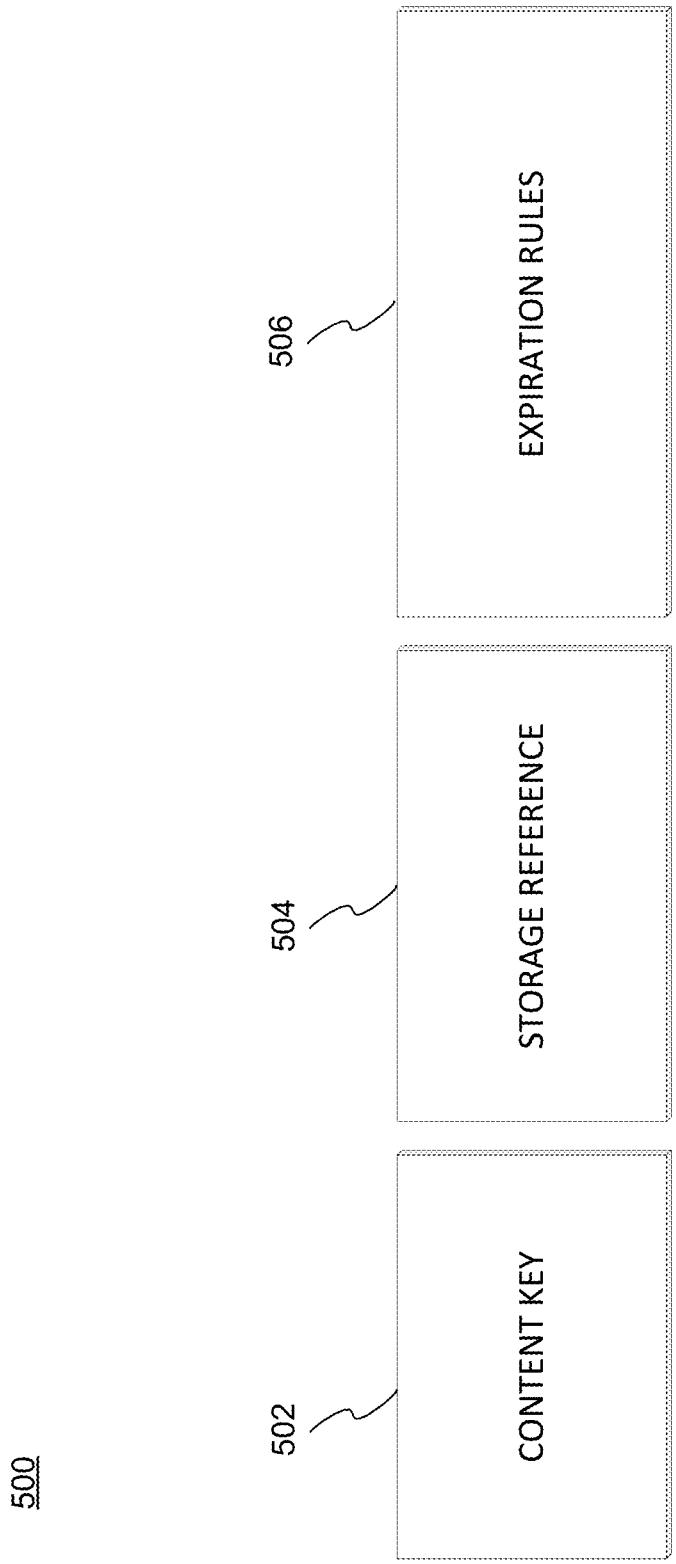
FIG. 5 illustrates a temporary transfer cache according to some embodiments.

FIG. 5 illustrates a temporary transfer cache according to some embodiments.

As shown in diagram 500, a temporary transfer cache may include content key 502, storage reference 504, and expiration rules 506, for example. Upon receiving an optical representation of the temporary token, the recipient may have up until the expiration of the token to retrieve the registered content of the token. The content may include the location/key pairs, which pertain to the transferred content.

Figure 6:
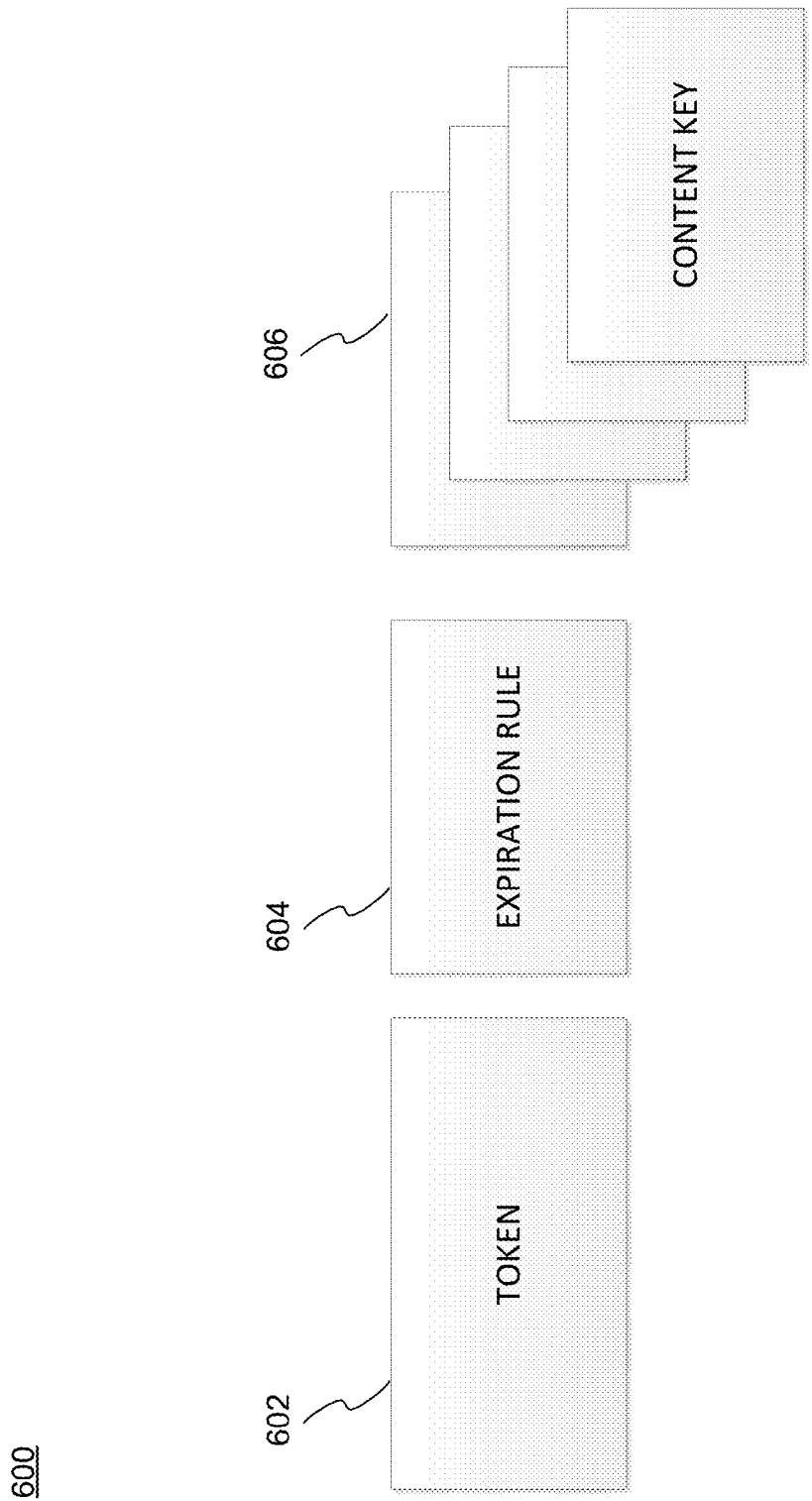
FIG. 6 illustrates transfer token registration according to some embodiments.

FIG. 6 illustrates transfer token registration according to some embodiments.

Diagram 600 shows the registration of token 602 using expiration rule 604 and content keys 606. The recipient, after receiving the registered content of the token, may retrieve the data from its storage location on the server. When the additional layer of security described above is used, the received content may be encrypted. The optical code may then include of the temporary token and a decryption key for the content handled by this transfer. The receiver may use the key to decrypt the content.

Figure 7:
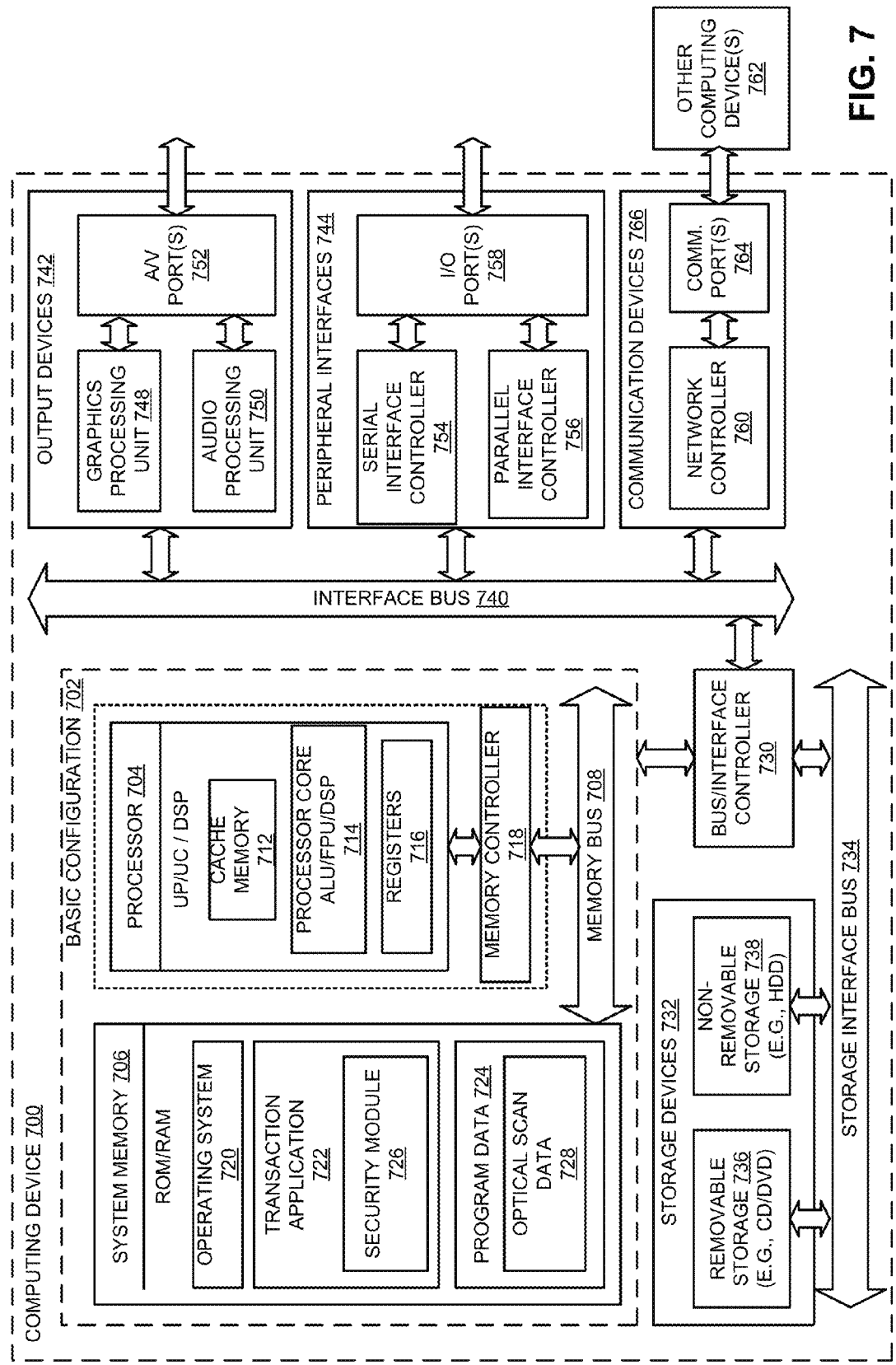
FIG. 7 is a block diagram of a computing device, where a method according to embodiments may be implemented.

FIG. 7 is a block diagram of a computing device, where a method according to embodiments may be implemented.

For example, the computing device 700 may be a mobile device such as a smart phone used for accessing a data transfer or secure transaction system as described herein. In an example basic configuration 702, the computing device 700 may include one or more processors 704 and a system memory 706. A memory bus 708 may be used for communicating between the processor 704 and the system memory 706. The basic configuration 702 is illustrated in FIG. 7 by those components within the inner dashed line.

Depending on the desired configuration, the processor 704 may be of any type, including but not limited to a microprocessor (μP), a microcontroller (μC), a digital signal processor (DSP), or any combination thereof. The processor 704 may include one more levels of caching, such as a level cache memory 712, a processor core 714, and registers 716. The example processor core 714 may include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, a transaction application 722, and program data 724. The transaction application 722 may include a security module 726 for ensuring optical scan based secure handshake for data exchange and identification based transactions as described herein. The program data 724 may include, among other data, optical scan data 728 or the like, as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (e.g., one or more output devices 742, one or more peripheral interfaces 744, and one or more communication devices 766) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 766 includes a network controller 760, which may be arranged to facilitate communications with one or more other computing devices 762 over a network communication link via one or more communication ports 764. The one or more other computing devices 762 may include servers at a datacenter and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations.

According to some examples, a method for a proximity based secure transaction initiation may include generating a unique text temporary token; registering the temporary token with a server; generating an optically readable code based on the temporary token; displaying the optically readable code to a user; and enabling the user to access a data exchange transaction by scanning the optically readable code.

The method may also include authenticating the user by having scanned the optically readable code. Registering the temporary token may include providing the token, one or more content keys, and an expiration rule to the server, where the expiration rule includes one or more of a time/date and a number of scans of the optically readable code. The method may also include rendering content available to the user until a latest of expiration dates of any token associated with the content and that of a content key.

In other examples, the method may include generating a unique key for the content, where registering the temporary token further includes providing a storage location and the content key to the server. The method may further include assigning the content a validity expiration rule that includes one or more of a date/time and a number of downloads, encrypting the content prior to registration with the server, including a decryption key in the optically readable code, and enabling the user to download the encrypted content from the server and decrypt using the scanned decryption key. The decryption key may be configured to be a one-time-use key. The method may also include displaying the optically readable code on one or more of a mobile device display, a computer monitor, a public monitor, a website, and a physical material. The physical material may be a label, a product, and a wall display.

According to further examples, a server for providing proximity based secure transaction initiation may include a memory configured to store instructions, a communication module, and a processor coupled to the memory and the communication module. The processor may receive a unique temporary token that includes at least a location of content to be made available to a user and a key associated with the content; receive the temporary token from the user obtained through scanning of an optically readable code based on the temporary token; and enable the user to access the content in response to receiving the temporary token.

Access to the content may be restricted by an entity generating the optically readable code by one of restricting one of a visibility and a configuration of the optically readable code.

The restriction of the configuration of the optically readable code may include one or more of restriction of results of a scan by time, an availability rule, and a privacy rule. The optically readable code may be associated with a predefined system and access to the content may be denied if the user lacks permission for accessing the predefined system.

The processor may ensure that no personal information is exchanged during the temporary token based authorization of the user to access the content. The processor may also enable the user to access one or more of a social network, a communication system, a financial transaction system, and a service system that involves exchange of sensitive information in response to receiving the temporary token. The processor may further enable the user to authenticate to a web based service in response to receiving the temporary token. The user may be enabled to access the content through one of the server and directly from a storage location of the content.

According to yet other examples, a computer-readable storage medium may have stored instructions thereon for a proximity based secure transaction initiation. The instructions may include generating a unique text temporary token; registering the temporary token with a server; generating an optically readable code based on the temporary token; displaying the optically readable code to a user on one or more of a mobile device display, a computer monitor, a public monitor, a website, and a physical material; and one or more of enabling the user to access a data exchange transaction and authenticating the user by having scanned the optically readable code. The instructions may further include enabling a plurality of users to access the data exchange transaction and terminate their access at their discretion.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented, according to embodiments formed, individually and/or collectively, by a wide range of hardware, software, firmware, or virtually any combination thereof.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

I claim:

1. A method for a proximity based secure transaction initiation, the method comprising:
 generating a unique text temporary token;
 registering the temporary token with a server, wherein the temporary token includes encrypted content and is subject to an expiration rule;

generating an optically readable code based on the temporary token;
presenting the optically readable code to a user through a display of one or more of a mobile device, a computer monitor, a public monitor, a website, and a physical material;
enabling the user to access a data exchange transaction by scanning the optically readable code through a camera of another mobile device, wherein
the data exchange transaction provides access to the encrypted content,
the optically readable code includes a decryption key for decrypting the encrypted content, and
access to the data exchange transaction is restricted to the other mobile device within a visibility area of the display presenting the optically readable code; and
enabling an entity that generates the optically readable code to further restrict access to the data exchange transaction based on the expiration rule, wherein the expiration rule includes a number of allowable scans of the optically readable code.

2. The method of claim 1, further comprising:
authenticating the user by having scanned the optically readable code.

3. The method of claim 1, wherein registering the temporary token includes providing the temporary token and one or more content decryption keys.

4. The method of claim 1, further comprising:
rendering encrypted content available to the user until a latest of expiration dates of any token associated with the encrypted content and that of one or more decryption content keys.

5. The method of claim 4, further comprising:
providing a storage location to the server.

6. The method of claim 4, further comprising:
assigning the encrypted content a validity expiration rule that includes one or more of a date/time and a number of downloads.

7. The method of claim 4, further comprising:
enabling the user to download the encrypted content from the server and decrypt using the scanned decryption key, wherein the content is encrypted prior to registration with the server.

8. The method of claim 7, wherein the decryption key is configured to be a one-time-use key.

9. The method of claim 1, wherein the physical material is a label, a product, and a wall display.

10. A non-transitory computer-readable storage medium with instructions stored thereon for a proximity based secure transaction initiation, the instructions comprising:
generating a unique text temporary token;
registering the temporary token with a server, wherein the temporary token includes encrypted content and is subject to an expiration rule;
generating an optically readable code based on the temporary token;
presenting the optically readable code to a user on a display of one or more of a mobile device, a computer monitor, a public monitor, a website, and a physical material;
enabling the user to access a data exchange transaction by scanning the optically readable code through a camera of another mobile device, wherein
the data exchange transaction provides access to the encrypted content,
the optically readable code includes a decryption key for decrypting the encrypted content, and
access to the data exchange transaction is restricted to the other mobile device within a visibility area of the display presenting the optically readable code;
authenticating the user by having scanned the optically readable code; and
enabling an entity that generates the optically readable code to further restrict access to the data exchange transaction based on the expiration rule, wherein the expiration rule includes a number of allowable scans of the optically readable code.

11. The non-transitory computer-readable storage medium of claim 10, wherein the instructions further comprise:
enabling one of: the user and another user to access the data exchange transaction and terminate the access to the data exchange transaction at one or more of: discretion of the user and discretion of the other user.

* * * * *